United States Patent [19]

McCoy

[11] 4,374,654

[45] Feb. 22, 1983

[54] ABSORPTIVE SEPARATION OF HCL AND H₂S FROM CATALYTIC REFORMER OFFGAS

[75] Inventor: Charles S. McCoy, Orinda, Calif.

[73] Assignee: Chevron Research Company, San Francisco, Calif.

[21] Appl. No.: 289,172

[22] Filed: Aug. 3, 1981

[51] Int. Cl.³ .................................................. B01D 53/04
[52] U.S. Cl. ............................................ 55/71; 55/73; 55/74; 55/75; 423/230
[58] Field of Search ........................ 55/71, 73, 74, 75; 423/230, 240 A, 244 S

[56] References Cited

U.S. PATENT DOCUMENTS

| | | | |
|---|---|---|---|
| 2,408,950 | 10/1946 | Pines et al. | 55/71 X |
| 3,001,607 | 9/1961 | Eng et al. | 55/71 X |
| 3,029,575 | 4/1962 | Eng et al. | 55/71 X |
| 3,078,634 | 2/1963 | Milton | 55/73 X |
| 3,078,640 | 2/1963 | Milton | 55/73 |
| 3,197,942 | 8/1965 | Haisty et al. | 55/71 |
| 3,953,587 | 4/1976 | Lee et al. | 55/73 X |
| 4,263,020 | 4/1981 | Eberly, Jr. | 55/74 X |

FOREIGN PATENT DOCUMENTS

| | | | |
|---|---|---|---|
| 2650711 | 10/1977 | Fed. Rep. of Germany | 423/230 |
| 1397 | of 1856 | United Kingdom | 423/230 |
| 914398 | 1/1963 | United Kingdom | 423/230 |
| 1210863 | 11/1970 | United Kingdom | 423/230 |

Primary Examiner—Robert H. Spitzer
Attorney, Agent, or Firm—Burns, Doane, Swecker & Mathis

[57] ABSTRACT

A two stage low temperature adsorptive separation process for removing HCl and H₂S from a catalytic reforming offgas to make the offgas useful as a feed to a steam reforming process. In the first stage the offgas is passed through a molecular sieve bed that adsorbs HCl selectively. In the second bed the HCl depleted offgas is passed through a zinc oxide bed to remove the H₂S. The H₂S and HCl content of the offgas are reduced to levels that do not significantly poison the catalysts used in the steam reforming process.

6 Claims, 1 Drawing Figure

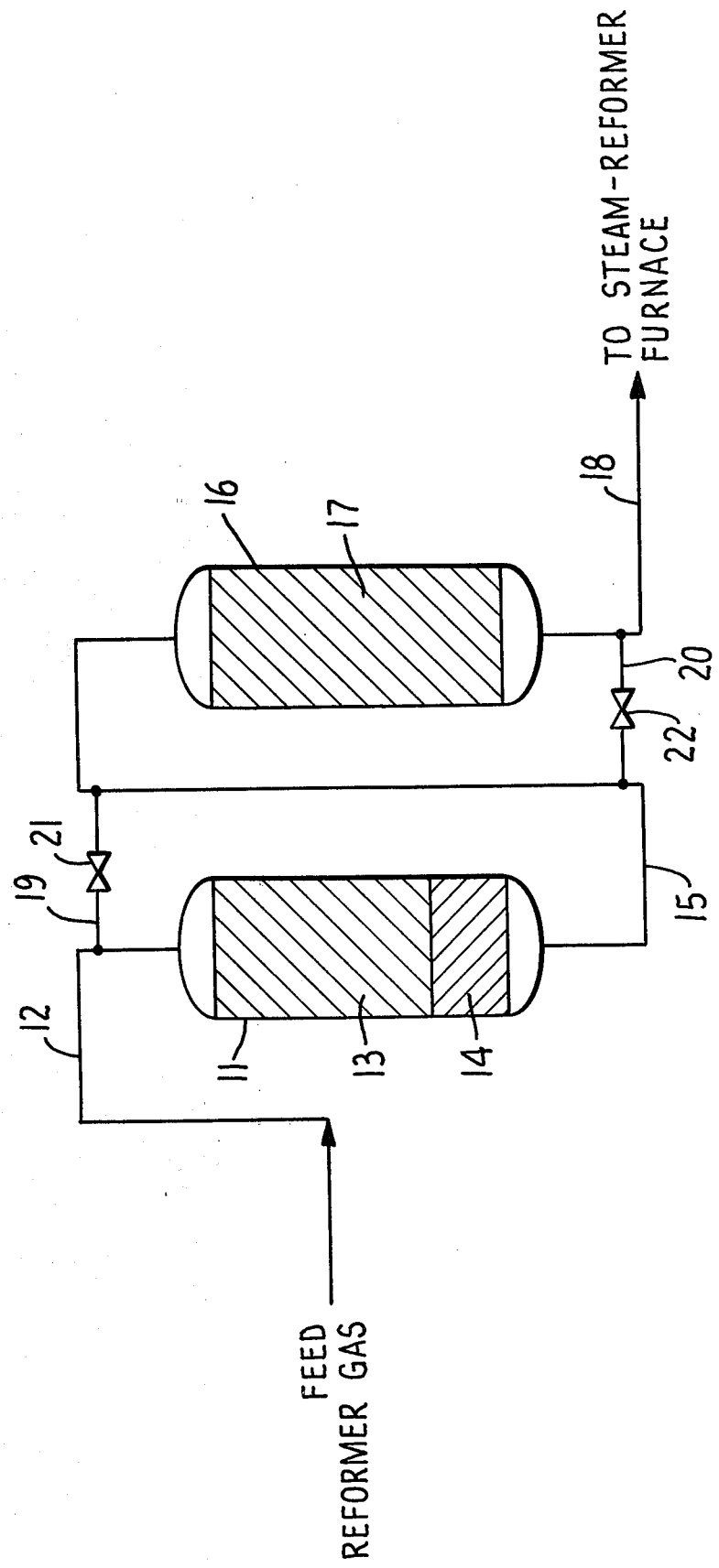

ABSORPTIVE SEPARATION OF HCL AND H₂S FROM CATALYTIC REFORMER OFFGAS

BACKGROUND OF THE INVENTION

1. Field of the Invention

The invention relates to an adsorptive separation process for removing H₂S and HCl from a catalytic reformer offgas to make the offgas useful as a feed for a steam reforming process.

2. Description of the Prior Art

Steam reforming is a process that is used to convert hydrocarbons into a hydrogen-rich gas. It is commonly used to make synthesis gas for ammonia manufacture. Most ammonia synthesis based on steam reforming uses a light hydrocarbon-containing gas stream as a feed. The feedstock is first treated to remove contaminants that would poison the reforming catalyst or other catalysts used in the synthesis. The purified feedstock is then mixed with steam and reformed over a reforming catalyst, usually nickel supported on alumina. This reforming step is called "primary reforming" and involves the following chemical reaction:

$$C_nH_{(2n+2)} + nH_2O \rightarrow nCO + (2n+1)H_2$$

After the primary reforming step, air is added in a secondary reforming step, also usually carried out over a nickel-alumina catalyst, where the oxygen in the air is consumed. The nitrogen in the air provides the nitrogen for the ammonia synthesis. If the steam reforming is being used to make hydrogen not intended for ammonia synthesis, the secondary reforming will usually be eliminated. A shift conversion is then carried out on the reformed gas to produce more hydrogen and convert carbon monoxide to carbon dioxide. The shift conversion involves the following chemical reaction:

$$CO + H_2O \rightarrow H_2 + CO_2$$

The shift conversion is usually carried out in two stages. The first is at a high temperature usually over an iron oxide catalyst and the second at a low temperature usually over a catalyst comprising copper oxide supported on zinc oxide and alumina. After the shift conversion, the bulk of the CO₂ is removed from the gas by scrubbing. The remaining quantities of carbon oxides are removed in a methanation step and the synthesis gas is reacted and compressed into ammonia.

The catalysts used in the reforming and shift conversion are extremely sensitive to poisoning by sulfur and chlorine. Therefore, it is essential that these contaminants be substantially removed from the gas feedstock, usually to levels below about 0.5 ppm and preferably to levels below 0.1 ppm, before the feedstock is charged to the process. Several methods have been used or suggested for removing sulfur compounds, including H₂S and HCl from feedstock to steam reforming processes. The two most common methods for removing H₂S are low temperature adsorption by a bed of activated carbon and high temperature adsorption by a bed of zinc oxide. Activated carbon is not effective for adsorbing HCl. Also, it must be regenerated frequently by taking the bed out of service and stripping it with steam or hot gases. Zinc oxide removes H₂S and to some extent chlorine at elevated temperatures. Zinc oxide beds are usually designed to adsorb H₂S to the extent that sulfur constitutes about 20% of the bed weight. Zinc oxide beds are not regenerable.

Molecular sieves have also been used to remove both H₂S and HCl from steam reforming feedgas. In addition, they have been disclosed as being useful to selectively remove HCl or H₂S from gases in other processes. See U.S. Pat. Nos. 3,001,607, 3,078,634, 3,078,640, and 3,197,942.

SUMMARY OF THE INVENTION

The present invention is a two-stage low temperature process for purifying a particular kind of feedgas to a steam reforming process, namely a catalytic oil reforming offgas. Such offgases contain only low levels of two contaminants that must be removed to make it suitable for steam reforming: H₂S and HCl. Specifically, the process involves the following steps:

(a) passing the offgas at a temperature in the range of about 40° C. to 70° C. through a molecular sieve or activated alumina bed that selectively adsorbs HCl, and thereafter (b) passing the HCl-depleted offgas at said temperature through a bed of zinc oxide that adsorbs H₂S from the offgas, whereby HCl and H₂S are removed from the offgas to an extent that the HCl and H₂S contents of the offgas leaving the beds are below that which would significantly poison a steam reforming catalyst.

BRIEF DESCRIPTION OF THE DRAWING

The drawing is a schematic flow diagram of the preferred embodiment of the invention process.

DETAILED DESCRIPTION OF THE INVENTION

The feedgas to the invention process is an offgas from a catalytic reforming process. Catalytic reforming processes are normally used to convert various oil feedstocks, usually naphthas, into high octane fuels. The primary reaction mechanisms involved in catalytic reforming are: dehydrogenation of naphthenes; dehydrocyclization of paraffins; paraffin isomerization; dehydroisomerization of naphthenes; paraffin hydrocracking; desulfurization; and olefin saturation. Catalytic reforming offgases usually comprise hydrogen, C₁-C₄ alkanes, and small amounts of H₂S and HCl, usually less than about 10 ppm each of H₂S and HCl and more usually less than about 5 ppm of each. In many instances the offgas will be debutanized so that its hydrocarbon content is composed primarily of methane, ethane, and propane.

The invention provides an adsorptive system for purifying the offgas that is capable of prolonged operation without regeneration and does not require costly heating apparatus for hot operation. Referring to the drawing, the offgas from the catalytic reformer is charged at temperatures below about 100° C., usually about 40° C. to 70° C., to a first downflow adsorption vessel 11 via conduit 12. The upper portion of vessel 11 contains a fixed molecular sieve bed 13. The adsorbent of this bed is a zeolite, such as type 4A, that selectively adsorbs HCl. At the temperatures indicated the bed will adsorb up to about 10% by weight, typically 5% to 10% by weight, HCl before HCl breakthrough. Activated alumina is an alternative HCl adsorbent to molecular sieves. Molecular sieve is preferred because of its strong affinity for HCl and its ability to attain low effluent chloride levels. H₂S passes through the bed (after an initial transient equilibration) with very little adsorption occurring. The feed rate to the molecular sieve bed based on the gas volume at standard temperature and pressure per hour per volume of sieve will usually be in the range of 2000 to 20,000 v/v/hr.

The lower portion of vessel 11 contains a small auxiliary bed 14 of zinc oxide. Zinc oxide is capable of adsorbing about 3% to 5% by weight $H_2S$ at the above indicated temperatures before breakthrough and about 2% by weight or less HCl before HCl breakthrough. Bed 14 removes some of the $H_2S$ contained in the gas and any HCl that may have passed through the molecular sieve bed. After passing through bed 14 the gas exits the bottom of vessel 11 via line 15 and is carried thereby to the top of a second downflow adsorption vessel 16. Vessel 16 contains the main bed 17 of zinc oxide. As the gas passes down through the main zinc oxide bed most of the remaining $H_2S$ is adsorbed. Accordingly, the gas leaving the bottom of vessel 16 via line 18 is substantially depleted of both HCl and $H_2S$ and contains no more than about 0.1 ppm of each. The feed rate to the zinc oxide (combined auxillary and main beds) based on the gas volume to the bed volume will usually be in the range of 1000 to 10,000 v/v/hr. Line 18 carries the purified gas to the steam reforming reactors.

The two vessel adsorptive separation scheme shown in the drawing is capable of being converted temporarily to a single vessel scheme while the adsorbent in the other vessel is being replaced. This is made possible by the dual beds in the first vessel and a pair of bypass lines 19, 20. Line 19 bypasses vessel 11 and runs between lines 12 and 15. It includes a valve 21 by which it may be opened or closed to gas flow. Line 20 bypasses vessel 16 and runs between line 15 and line 18. It, too, contains a valve, designated 22, that may be used to open or close the line to gas flow. In normal operation valves 21 and 22 are closed and the gas flows through both adsorption vessels. When it is necessary or desirable to take vessel 11 temporarily out of service valve 21 is opened allowing the offgas feed to bypass vessel 11 and be fed directly to vessel 16. As indicated above, zinc oxide has a limited capacity to remove HCl as well as the capacity to remove $H_2S$ from the gas. Both of these capacities are utilized when the first vessel is bypassed. Correlatively, when it is necessary or desirable to take vessel 16 out of service, valve 22 is opened to permit the gas exiting vessel 11 to flow from line 15 to line 18 and thereby bypass the second vessel. In this instance the dual beds—molecular sieve and zince oxide—contained in vessel 11 function to remove the HCl and $H_2S$ to the required levels.

The following hypothetical example further illustrates the invention process. This example is not intended to limit the invention in any manner. Unless indicated otherwise percentages are given by volume.

The catalytic reformer offgas treated in this example has the following composition:

| Component | |
|---|---|
| $H_2$ | 76.7% |
| $CH_4$ | 14.1% |
| $C_2H_6$ | 5.6% |
| $C_3H_8$ | 3.2% |
| $H_2S$ | 2 ppm |
| HCl | 2 ppm |

The temperature of the gas is approximately 50° C. and it is under a pressure of 18 kg/cm².

The adsorption apparatus is essentially the same as that shown in the drawing except that the first adsorption vessel does not contain an auxillary zinc oxide bed and there is no bypass piping. The molecular sieve bed of the first vessel is composed of type 4A zeolite, effective pore size approximately 0.4 nm. The offgas feed rate to the first vessel, based on the volume of gas per hour at standard temperature and pressure per volume of sieve, is 5000 v/v/hr. The feedrate to the second vessel, based on the volume of gas per hour at standard temperature and pressure per volume of zinc oxide, is 2500 v/v/hr. The gas leaving the second vessel is analyzed by conventional techniques for HCl and $H_2S$ and contains less than 0.1 ppm of each.

As described above the invention provides an HCl and $H_2S$ adsorbent system that may be used to effectively remove low levels of these gases from refinery offgases to make such offgases suitable steam reforming feedstocks. The system operates at a low temperature and thus avoids costly preheaters for hot operation. It can be modestly sized and will still provide adequate life, thus reducing regeneration and replacement costs. The invention process applies particularly to converting an existing steam reforming plant that uses natural gas as feed and a low temperature adsorption separation process to a plant capable of using catalytic reforming offgas as a feed.

Modifications of the above described embodiments of the invention that are obvious to those of ordinary skill in the chemical processing and refining arts are intended to be within the scope of the invention.

What is claimed is:

1. A substantially continuous adsorptive separation process for removing HCl and $H_2S$ from a catalytic reforming offgas that contains less than about 10 ppm each of HCl and $H_2S$ to make the offgas useful as a feedgas for a steam reforming process comprising:
   (a) passing the offgas at a temperature in the range of about 40° C. to 70° C. through a molecular sieve or activated alumina bed that adsorbs HCl selectively from the offgas, and
   (b) thereafter passing the HCl-depleted offgas at said temperature through a zinc oxide bed that adsorbs $H_2S$ from the offgas, whereby HCl and $H_2S$ are removed from the offgas to an extent that the HCl and $H_2S$ contents of the offgas leaving the beds are below that which would significantly poison a steam reforming catalyst.

2. The process of claim 1 wherein the offgas contains less than about 5 ppm HCl and less than about 5 ppm $H_2S$.

3. The process of claim 1 wherein the HCl and $H_2S$ contents of the offgas leaving the beds are each below about 0.1 ppm.

4. The process of claims 1, 2 or 3 wherein the molecular sieve is a type 4A zeolite.

5. The process of claim 1 wherein the flow rate of offgas through the molecular sieve bed based on the gas volume per hour at standard temperature and pressure per volume of sieve is in the range of about 2000 to about 20000 v/v/hr and the gas flow rate of offgas through the zinc oxide bed based on the gas volume per hour at standard temperature and pressure per zinc oxide volume is in the range of about 1000 to about 10000 v/v/hr.

6. A substantially continuous adsorptive separation process for removing HCl and $H_2S$ from a catalytic reforming offgas that contains less than about 10 ppm each of HCl and H₂S to make the offgas useful as a feedgas for a steam reforming process comprising:
   (a) passing the offgas at a temperature in the range of about 40° C. to 70° C. through an activated alumina bed that adsorbs HCl selectively from the offgas, and
   (b) thereafter passing the HCl-depleted offgas at said temperature through a zinc oxide bed that adsorbs H₂S from the offgas, whereby HCl and H₂S are removed from the offgas to an extent that the HCl and H₂S contents of the offgas leaving the beds are below that which would significantly poison a steam reforming catalyst.

* * * * *